United States Patent
Zhang et al.

(10) Patent No.: US 10,605,229 B2
(45) Date of Patent: Mar. 31, 2020

(54) WIND FARM INERTIAL RESPONSE

(71) Applicant: ABB Schweiz AG, Baden (CH)

(72) Inventors: Yan Zhang, Baden (CH); Jan Poland, Nussbaumen (CH); Adrian Vasile Timbus, Baden-Dättwil (CH); Carsten Franke, Stetten (CH); Kedar Kulkarni, Bangalore (IN); Silvia Mastellone, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/816,729

(22) Filed: Nov. 17, 2017

(65) Prior Publication Data

US 2018/0073486 A1    Mar. 15, 2018

Related U.S. Application Data

(63) Continuation of application No. PCT/EP2016/061144, filed on May 18, 2016.

(30) Foreign Application Priority Data

May 18, 2015 (EP) .................... 15167966

(51) Int. Cl.
  *F03D 9/00* (2016.01)
  *H02P 9/04* (2006.01)
  (Continued)

(52) U.S. Cl.
  CPC .......... *F03D 7/048* (2013.01); *F03D 7/0284* (2013.01); *F03D 9/257* (2017.02); *H02P 9/04* (2013.01);
  (Continued)

(58) Field of Classification Search
  CPC .............................. F03D 7/048; F03D 7/0284
  See application file for complete search history.

(56) References Cited

U.S. PATENT DOCUMENTS

| | | | |
|---|---|---|---|
| 7,750,490 B2 | 7/2010 | Scholte-Wassink | |
| 2005/0042098 A1* | 2/2005 | Wobben | ................ F03D 7/0272 416/132 B |

(Continued)

FOREIGN PATENT DOCUMENTS

EP    2634422 A1    9/2013

OTHER PUBLICATIONS

European Patent Office, International Search Report & Written Opinion issued in corresponding Application No. PCT/EP2016/061144, dated Jul. 19, 2016, 9 pp.

(Continued)

*Primary Examiner* — Tulsidas C Patel
*Assistant Examiner* — Thomas K Quigley
(74) *Attorney, Agent, or Firm* — Taft Stettinius & Hollister LLP; J. Bruce Schelkopf

(57) ABSTRACT

The present invention is concerned with an operation of a wind farm with a plurality of wind turbines in view of a dynamic frequency response. According to the invention, dynamic frequency support and power production for all wind turbines in a wind farm are handled concurrently in a single optimization step and taking into account wake effects within the wind farm as well as optional wind forecast information. The dynamic frequency support capability of the entire wind farm is planned in advance according to grid requirements and power system condition changes. While existing methods de-load wind turbines with a static percentage in order to supply additional power when needed, the proposed method incorporates the dynamic frequency support into the optimal operation system of wind farm.

21 Claims, 6 Drawing Sheets

(51) Int. Cl.
  *F03D 7/04* (2006.01)
  *F03D 7/02* (2006.01)
  *F03D 9/25* (2016.01)
(52) U.S. Cl.
  CPC . *F05B 2260/8211* (2013.01); *F05B 2270/107* (2013.01); *F05B 2270/20* (2013.01); *F05B 2270/304* (2013.01); *F05B 2270/328* (2013.01); *F05B 2270/329* (2013.01); *F05B 2270/335* (2013.01); *F05B 2270/337* (2013.01); *Y02E 10/723* (2013.01); *Y02E 10/725* (2013.01)

(56) References Cited

U.S. PATENT DOCUMENTS

| | | | | |
|---|---|---|---|---|
| 2008/0284172 | A1* | 11/2008 | Nielsen | F03D 7/026 290/44 |
| 2009/0055030 | A1 | 2/2009 | Mayor et al. | |
| 2011/0012352 | A1* | 1/2011 | Nelson | F03D 7/0272 290/44 |
| 2011/0049903 | A1* | 3/2011 | Jorgensen | F03D 7/0224 290/55 |
| 2011/0187106 | A1* | 8/2011 | Ichinose | F03D 7/048 290/44 |
| 2011/0285130 | A1* | 11/2011 | Thisted | F03D 7/0224 290/44 |
| 2012/0133138 | A1* | 5/2012 | Sorensen | F03D 7/028 290/44 |
| 2014/0103652 | A1* | 4/2014 | Ubben | F03D 7/028 290/44 |
| 2014/0375054 | A1* | 12/2014 | Kang | F03D 7/0284 290/44 |
| 2015/0249415 | A1* | 9/2015 | Babazadeh | H02J 3/16 290/44 |
| 2015/0308413 | A1* | 10/2015 | Bhaskar | F03D 7/028 290/44 |
| 2016/0040653 | A1* | 2/2016 | Kang | F03D 7/0284 290/44 |
| 2016/0333854 | A1* | 11/2016 | Lund | F03D 7/047 |
| 2017/0051723 | A1* | 2/2017 | Kj R | F03D 7/0284 |
| 2017/0115685 | A1* | 4/2017 | Kang | G05F 5/00 |

OTHER PUBLICATIONS

European Patent Office, Extended Search Report issued in corresponding Application No. 15167966.9, dated Nov. 4, 2015, 7 pp.
Aho, J. et al., "A Tutorial of Wind Turbine Control for Supporting Grid Frequency through Active Power Control," 2012 American Control Conference, Fairmont Queen Elizabeth, Montreal, Canada, Jun. 27-29, 2012, pp. 3120-3131.
Erlich, I, et al., "Primary frequency control by wind turbines," Proceedings of the IEEE Power and Energy Society General Meeting, Minneapolis, Minnesota, Jul. 2010, pp. 1-8.
Lebioda, A. et al., "Investigation of Disposable Reserve Power in a Large-Scale Wind Farm," Power Tech, 2005 IEEE Russia, IEEE, Piscataway, New Jersey, Jun. 27, 2005, pp. 1-6.
Lee, J. et al., "Rotor Speed-based Droop of a Wind Generator in a Wind Power Plant for the Virtual Inertial Control," J. Electr. Eng. Technol., vol. 8, Jan. 1, 2013, pp. 742-749.
Pradhan, C. et al., "Adaptive deloading of stand-alone wind farm for primary frequency control," Energy Syst. (2015), vol. 6, pp. 109-127.
European Patent Office, International Preliminary Report on Patentability issued in corresponding Application No. PCT/EP2016/061144, dated Apr. 18, 2017, 13 pp.
E.On Netz: "Ergänzende Netzanschlussregeln für Windenergieanlagen Zusätzliche technische und organisatorische Regeln für den Netzanschluss von Windenergieanlagen innerhalb der Regelzone der E.ON Netz GmbH," Dec. 1, 2001, retrieved from: http://www.virtual-powerlant.com/Sonstiges/Downloads/EON_Erg_nzende_Netzanschlussregeln_F_r_WEA_12-01.pdf (cited in Search Report).

* cited by examiner

WIND FARM INERTIAL RESPONSE

FIELD OF THE INVENTION

The invention relates to the operation of a wind farm including a plurality of electrically interconnected wind turbine generators. Specifically, it relates to an operation of the wind farm in view of a support or stabilization of a grid frequency of an electrical power transmission grid connected to the wind farm.

BACKGROUND OF THE INVENTION

In a wind farm or wind power plant with a plurality of wind turbines, the first row of turbines that are reached by the unimpeded flow of air mass may extract a maximum amount of kinetic energy. However, due to this energy extraction by upstream or upwind turbines, the downstream or downwind turbines experience lower wind-speeds and turbulent wind conditions. This phenomenon, widely known as 'wake effect', may have an impact on an amount of electrical energy generated by downstream wind turbines as well as on fatigue load or other degradation of downstream wind turbine components.

In conventional wind farm management a wind farm controller dispatches set-points regarding active and reactive power generation to individual wind turbines without accounting for wake interactions. The local control of most variable-speed horizontal axis wind turbines under a maximum power point tracking perspective is then based on three types of mechanical actuators or wind turbine operation parameters including yaw control, blade pitch control, and generator torque control. Depending on the settings of these actuators the turbine can extract different amounts of energy, but these settings also directly influence the resulting wakes and thus the power generation at downwind turbines.

The system inertia of an electrical power system is the inherent ability to resist changes in a network frequency or grid frequency following a so called frequency event, which may be caused by a system disturbance, contingency, or other imbalance between load and production power. The system inertia is indicative of a time that lapses until the delayed change in frequency. The rotating mass of a conventional synchronous generator provides a natural inertial response that slows the rate of change in the grid frequency. Specifically, by releasing kinetic energy from the rotating masses into the system a synchronous generator directly connected to the grid and operating at the grid frequency counteracts a frequency decrease in proportion to a frequency change rate df/dt, at the expense of decreasing a rotational speed of the rotor.

Wind turbine generators may also contribute to system inertia and frequency stabilization since an appreciable amount of kinetic energy, albeit depending on available wind speed and rotor speed, is stored in the rotating blades of a wind turbine. However, most of the modern wind farms are equipped with variable-speed generators where the turbine rotor speed is decoupled from system electrical frequency through power electronics converters. Variable-speed wind turbines are equipped with voltage source converters which are either designed for the full rated power or, in the case of Doubly-Fed Induction Generators (DFIG), for about one third of the rated power. The converter may be controlled in order to adjust a generator load torque which the generator exerts on the rotor, specifically, power extraction from the rotating rotor may be increased by increasing the torque exerted by the generator acting on the rotor. While there is no natural or inherent inertial response provided from a variable-speed wind turbine, variable-speed wind turbines controlled in a specific manner may produce a fast response emulating, or mimicking, a natural inertia response. Such a controlled response to frequency changes may then be termed a 'synthetic' or 'virtual' inertial response, or kinetic energy control.

Electrical energy cannot easily be stored in large amounts within an electricity distribution network, commonly referred to as a grid, by conventional means. Therefore an amount of electrical energy fed into the grid must, at any given moment, precisely match an amount being used, i.e. being taken out of the gird, to guarantee secure operation at a given, constant frequency (e.g. 50 Hz in Europe). Unexpected fluctuations between the feed-in and take-out, or generation and consumption, of electrical energy into/out of the grid must therefore be compensated for on short time scales. This may, in particular, be achieved by rapidly increasing or reducing feed-in by suppliers, e.g. power plant operators, who for this purpose, are required to foresee reserve energy in form of a so-called control reserve, in particular an active power control reserve. This is frequently also referred to as frequency power control or (active power) grid control.

Reserve energy is required when, in a current capacity balance of a control area, a sum of an actual feed-in and/or take-out deviates from a sum of the expected capacities. Such an deviation can originate on a load side of the grid—for instance as a result of meteorological factors, and/or inaccuracy in the load forecast—or on a production side—for example due to production restrictions or stoppages, additional output from hydroelectric power plants due to heavy precipitation. Transmission system operators are therefore required to continually use control power for offseting balance capacity variations in its control area. This may technically be achieved by a three-stage regulation procedure comprising primary, secondary, and tertiary frequency control, as e.g. provided in the technical specifications of the European Network of Transmission System Operators for Electricity ENTSO-E (UCTE, which until. July 1999 was known as UCPTE (Union pour la coordination de la production et du transport de l'électricité), was incorporated into ENTSO-E on 1 Jul. 2009 and continues to exist as «Regional Group Continental Europe).

In terms of present grid operation practices, active power control for power system dynamic frequency support is divided into separate control regimes operating on various time scales. Primary Frequency Control (PFC) aims at restoring a balance between power generation and consumption on a time scale of seconds of a deviation occurring, with active power delivered e.g. being a function of a frequency deviation $f-f_{target}$. During PFC operation, the frequency is stabilised within permissible limit values. In conventional power stations, activation takes place directly by means of turbine regulators. The network frequency is being monitored and, in case of deviations, the required primary control power needed is activated.

In addition, secondary frequency control or Automatic Generation Control (AGC) attempts at restoring the grid frequency to the scheduled value by acting on the cause of the disturbance on a time scale of minutes. Secondary control is typically activated after a few seconds, in particular after between 1 and 30 seconds, preferably between 2 and 5 seconds, and is typically completed after 10 and 30 minutes, preferably after 12-18 minutes. If the cause of the control deviation is not eliminated this time, secondary control is replaced by tertiary control. Generally secondary control power in the connected power stations is automatically actuated by a central grid controller. This requires these power stations to be in operation but not to be generating at a maximum or minimum possible nominal capacity, to be able to meet requirements of the central load frequency controller at all times.

Tertiary frequency control may be provided to disburden secondary frequency control, in particular in order to restore a sufficient reserve for secondary frequency control. The tertiary control reserve is primarily intended for adjusting major, persistent control deviations, in particular deviations occurring in connection with production outages or unexpectedly long-lasting load changes. Activation may, e.g., be triggered by electronically transmitted messages to suppliers, who are then required to adjust power plant production, typically within a time scale between 10 and 30 minutes, preferably within 12-18 minutes.

To allow for even tighter frequency control, fast control on a millisecond or sub-second time scale, which qualifies as virtual inertia, may also be applied.

For the purpose of this disclosure, dynamic frequency support continues at least until a frequency nadir is reached or until the secondary frequency control sets in. In particular, dynamic frequency support is considered to comprise both virtual inertia and primary frequency control.

Dynamic frequency support at wind turbine level may include active power reserve or prophylactic curtailment of the wind turbine output power below a maximum level and a temporary increase of the power in case of a frequency drop. Wind turbine output power curtailment comprises a deliberate reduction or de-loading of power output by some or all of the turbines within a wind farm. The power output of a variable-speed wind turbine generator may be controlled by varying the generator load torque and/or the blade pitch angles based on measurements of the generator shaft speed. Hence, curtailment includes reducing the set point of output power actively for a given wind speed and operating point, in order to allow for higher output power in response to any frequency event. Alternatively, a pitch angle of the rotor blades may be adjusted to slow down, or to accelerate or over-speed, a rotation of the rotor beyond an optimal tip speed ratio, which also reduces the power output by the wind turbine to a value below a maximum level otherwise possible for a given wind speed. The generator torque is induced by power electronics of the converter and may be actuated with negligible delay in all ranges of dynamic frequency support, while pitch motors for mechanical pitch angle adjustment may have slew-rate limits on the order of 10°/sec, hence activation of the latter is well suited for primary frequency control.

The article by I. Erlich and M. Wilch, entitled 'Primary frequency control by wind turbines', Proceedings of the IEEE Power and Energy Society General Meeting, Minneapolis, Minn., July 2010, proposes pitch angle control to maintain the curtailment level in order to support grid frequency in response to a frequency drop caused by an additional load. The article proposes a frequency support by utilizing kinetic energy stored in the rotating masses, to supply additional active power to the grid in case of a power imbalance. To that purpose, a carefully parametrized lead/lag compensator controller is proposed rather than a mere proportional frequency control. The article discloses the response of an inertia or kinetic energy control to a disturbance, which increases the electrical output of the wind turbine and in turn causes the rotor to decelerate on a time scale of some 10 seconds.

The U.S. Pat. No. 7,750,490 B2 proposes to increase the speed of rotation of a wind turbine rotor to above an optimum rated speed for a torque-power curve, e.g. by adjusting the pitch angle of the blades or a yaw angle of the nacelle body. Short-term over-speeding of the turbine allows to capture additional aerodynamic energy and to store the latter as inertial energy in a rotating drive train of the wind turbine. At the end of a curtailment period, the power output by the wind turbine may be increased by extracting the inertial energy stored in the drive train, by means of a frequency converter connected to a wind turbine generator and configured to control excitation of the generator to increase a torque demand on generator.

The article by Jinshik Lee et al., entitled 'Rotor speed-based droop of a wind generator in a wind power plant for the virtual inertial control', J Electr Eng Technol Vol. 8, page 742-749, 2013, is directed to virtual inertial energy control at wind farm level, proposing to use different droop parameters for individual wind turbines. To release more kinetic energy, the proposed algorithm has the gain of a frequency deviation loop for each DFIG wind turbine generator depend on the rotor speed of the turbine. On the other hand, the gain for the faster Rate-Of-Change-Of-Frequency ROCOF loop is set to be equal for all wind turbine generators, and in particular independent of the rotor speed. The article assumes that all wind turbine generators operate in Maximum Power Point Tracking MPPT control mode and thus have no de-loaded power, and considers wake effects via their effect on the rotor speed. Accordingly, non-uniform inertia activation in the wind farm is based on a present status of each wind turbine as determined by individual wind turbine operation optimisation.

DESCRIPTION OF THE INVENTION

It is therefore an objective of the invention to prepare for a dynamic frequency response by a wind farm with a plurality of wind turbines in a dynamic manner and in consideration of regular wind farm operation aspects. This objective is achieved by a method and a controller according to the independent claims. Preferred embodiments are evident from the dependent patent claims.

According to the invention, dynamic frequency support and power production for all wind turbines in a wind farm are handled concurrently in a single optimization step and taking into account wake effects within the wind farm as well as optional wind forecast information. The dynamic frequency support capability of the entire wind farm is planned in advance according to grid requirements and power system condition changes, and quantitatively expressed by a WF dynamic frequency support target value. While existing methods de-load wind turbines with a static percentage in order to supply additional power when needed, the proposed method incorporates frequency support into the dynamic optimal operation system of wind farm.

Specifically, operating a Wind Farm (WF) with a plurality of Wind Turbine Generators (WT) electrically connected, via a single substation or Point of Common Coupling (PCC), to a power grid or transmission network having a nominal grid frequency comprises the following steps:

Providing a WF dynamic frequency support target value or requirement, briefly referred to as dynamic frequency support target, for supporting, by the WF, a grid frequency of the power grid. The WF dynamic frequency support target value is established or defined based on requirements of the Transmission or Distribution System Operator (TSO/DSO) operating the power grid or a specific power system including the WF, and corresponds to an amount of active power reserve required to be available for dynamic frequency support. When a frequency event occurs, grid frequency support or stabilization may be provided by means of wind farm dynamic frequency support, and may aim at minimizing and/or delaying a deviation of the grid frequency, i.e. an actual grid frequency from a nominal value, i.e. the nominal grid frequency.

Determining, in a single optimization step, optimum turbine control input values $u_j^*$ for all WTs of the WF, based on the WF dynamic frequency support target and considering inter-WT wake effects. The optimum turbine control input values of each WT are input to individual WT controllers and may be indicative of, or representing, a WT dynamic frequency support target and/or a concurrent de-loaded WT power target.

Operating the WTs according to the optimum turbine control input values $u_j^*$.

In the present context, turbine control input values include one or more of a pitch angle, yaw angle, nacelle direction, rotor blade settings, rotation speed of the turbine, generator torque, and set-points for active P or reactive Q power of a wind turbine.

In a preferred variant of the invention, the optimum turbine control input values $u_j^*$ optimize an objective function J(u) indicative of an active power output and/or a dynamic frequency support of the WF, both depending on and determined from the turbine control input $u_j$ of each wind turbine that are to be optimized. In other words, the objective function may include terms that represent a WF active power output and/or a WF dynamic frequency support, as well as target values for both quantities.

In an advantageous embodiment of the invention, a wind forecast for the location of the WF is provided, and the optimum turbine control input values $u_j^*(t)$ optimize an objective function J(u) depending on the turbine control input of each wind turbine and on the wind forecast. Wind conditions, in particular wind speed and wind direction, may favour certain control input values, in particular if a forecast cost for changing set-points and activating actuators is taken into account.

Preferably, the wind forecast comprises a meteorological wind forecast and/or a local wind forecast, predicting wind conditions for the entire wind field and/or individual wind turbines. Meteorological wind forecast may be obtained from a public or private service provider providing national or regional weather forecast, based meteorological models, in particular on numerical weather prediction, which employs mathematical models of the atmosphere and oceans to predict the weather based on current weather conditions, using current weather observations relayed from radiosondes, weather satellites and other observing systems as inputs. In general, wind conditions predicted by available meteorological wind forecasts are uniform for the whole wind field; i.a. spatial resolution of the meteorological wind forecast does not allow taking into account different wind conditions at individual wind turbines of the wind farm.

Local wind forecast, allows for forecasting different wind conditions at individual wind turbines of the wind farm, in particular by taking into account wind propagation between individual wind turbines in order to allow for reflecting of the fact that any change in upstream wind speed will have effects on a downstream turbine after a certain time delay due to a so called wind speed transport. The delay $t_{delay}$ is a function of distance l and wind speed $v_w$ and may be obtained as $t_{delay}=l/v_w$.

Preferably, the local wind forecast for an individual wind turbine will take into account wind conditions from at least one upstream wind turbine, in particular wind speed and/or direction, which may be determined by one or more wind sensor located at a location of the upstream wind turbine, and/or on other observables related to the at least one upstream wind turbine, in particular on turbine control input values including one or more of a pitch angle, yaw angle, nacelle direction, rotor blade settings, rotation speed of the turbine, generator torque, and set-points for active P or reactive Q power, and/or on corresponding actual or observed values, in particular the rotational speed of the rotor. This allows for much more precise and reliable prediction of the wind conditions for the individual wind turbine, in particular on time scales on which virtual inertia and primary frequency control are effected.

Preferably, the local wind forecast for an individual wind turbine will take into account wake effects due at least one upstream wind turbine, preferably all upstream wind turbines. More preferably, wind conditions for the individual wind turbine are predicted based on computational models which take into account turbine control input values of the at least one upstream wind turbine including, in particular, one or more of a pitch angle, yaw angle, nacelle direction, rotor blade settings, rotation speed of the turbine, generator torque, and set-points for active P or reactive Q power, and/or corresponding actual or observed values, in particular pitch angle, yaw angle, nacelle direction, rotor blade settings and/or generator torque. This allows for taking into account the effects of changes of control input values, which are, in particular, necessary to provide for virtual inertia and/or primary frequency control, thus allowing for much more precise and reliable prediction of the wind conditions for the individual wind turbine, in particular on time scales on which virtual inertia and primary frequency control are effected. This, in turn, allows for the objective function J(u) to more precisely reflect actual wind conditions, and thus for more accurate optimization results.

Any of the proposed optimization schemes of wind farm operation may include aspects related to transmission network operator settings, transmission network requirements or constraints, topology of wind farms and the underlying collector grid, turbine operation constraints, estimated remaining operational time under different usage patterns and times, as well as aspects of the electricity market. Any of the proposed optimization schemes may be repeated at least upon provision of a changed WF dynamic frequency support target, an updated wind condition and/or power demand, or a changed WT operational status. Hence, the optimum turbine control input values $u_j^*$ respective of the wind farm dynamic frequency support target may be determined, or updated, at least every ten minutes, preferably every minute, still preferably every ten seconds, or even once per second.

In a further preferred embodiment, individual frequency deviation control parameter values such as droop settings or lookup tables are determined, preferably from a model of the WF, for each individual WT, based on and/or concurrent with the optimum turbine control input values $u_j^*$. The individual WT inertia controllers may involve such control parameter in a local frequency deviation or Rate-Of-Change-Of-Frequency (ROCOF) control loop. The control parameter may be correlated with an individual WT inertia target indicative of a dynamic frequency support capability of the respective individual wind turbine, and cause an inertia release or activation in correlation with an inertia target or power reserve of the WT as established by the optimum turbine control parameters. In particular, first row wind turbines may be activated last in order to maintain their wake at reduced level as long as possible. If determined centrally by a WF controller, the frequency deviation control parameters are preferably transmitted to the WT controllers in advance of any frequency event and in view of an autonomous individual frequency support contribution by each. WT, i.e. in particular to allow for autonomous individual frequency support by each individual WT.

In such a decentralized or asynchronous dispatch scenario, a centralized dynamic frequency support unit at WF level may simply enable or disable lower-level control loops at WT level. The latter then operate based on local measurements of the line or grid frequency and based on local control settings as communicated previously, and thus respond immediately to the frequency disturbance. The local control settings may include droops for PFC type local control loops, may be implemented as local lookup tables, as splines, polynomials, Artificial Neural Networks. Each WT may even be provided with a set of control parameters tables to be used successively during a frequency event.

Specifically, a local dynamic frequency support controller of the first WT may be operated in an inertial response mode lasting for less than a second following detection of a frequency event, based on a first, or short-term, frequency deviation control parameter value. The latter may be a parameter indicative of, in particular weighing, a frequency change rate (df/dt) contribution in the local dynamic frequency support controller. The inertial response mode may be followed by Primary Frequency Control (PFC) mode with the local dynamic frequency support controller of the first WT being operative based on a second, or mid-term, frequency deviation control parameter value on a time scale of seconds. The second frequency deviation control parameter value may be indicative of a frequency deviation (f-f$_{target}$) contribution in the local dynamic frequency support controller.

Alternatively, in a centralized dispatch scenario, a dynamic frequency support unit or WF controller at WF level determines, in a real-time optimization following a frequency event and based on an exclusive measurement of a deviating frequency at PCC, optimum frequency support turbine control input values u$_{fi}$* for all WTs of the WF. These values are instantaneously distributed or communicated to the individual WTs, which requires fast real-time communication, in particular if virtual inertia type of sub-second frequency responses are aimed at. In other words, if the communication is fast enough, then the dynamic frequency support unit may dispatch or command the demanded and pre-reserved real power increase to each turbine in the event of frequency disturbance, in which case no lower-level control loop at turbine level may be needed, so that control loops at wind turbine level, in particular local dynamic frequency support controller of the individual WT, may be—at least temporarily—disabled and thus be left devoid of any frequency input, or completely be dispensed with.

In a further preferred embodiment of the method in accordance with the present invention, u$_j$* denotes a reference value reference value for control of the j-th turbine in the wind field. u$_j$* may, e.g. be the active power reference P$_j$* of the j-th turbine. The objective function may then be given by J(u)=max $\Sigma_{j=1}^{n}(P_j)$, while at each turbine a constraint is P$_{WF-inertial}$=max$\Sigma_{j=1}^{n}(P_{j-inertial})$, where P$_{j-inertial}$=P$_{j-available}$−P$_j$, wherein P$_{WF-inertial}$ is the total inertial requirement of the WF, P$_{j-inertial}$ is the inertial reference of turbine j, and P$_{j-available}$ is the available active power of turbine j. Alternatively, u$_j$* may correspond to on/off (0,1) states of frequency control at turbine j, i.e. when u$_j$*=0 the frequency control of turbine j is disabled, whereas when u$_j$*=1 the frequency control of turbine j is enabled. The objective function may then e.g. be given by J(u)= P$_{WF-inertial}$=$\Sigma_{j=1}^{n}(P_{j-inertial})$.

BRIEF DESCRIPTION OF THE DRAWINGS

The subject matter of the invention will be explained in more detail in the following text with reference to preferred exemplary embodiments which are illustrated in the attached drawings, which depict.

DETAILED DESCRIPTION OF PREFERRED EMBODIMENTS

A wind turbine may comprise a rotor to which one or more wind turbine rotor blades are connected, wherein the rotor drives an electric generator, such as a synchronous generator having an outer rotor with plural permanent magnets. The generator may provide a variable frequency AC power stream to a converter, in particular an AC-DC-AC converter which converts the variable frequency AC power stream to a fixed frequency AC power stream which is then provided to the utility grid in order to provide plural consumers with electric energy.

Figure 1:
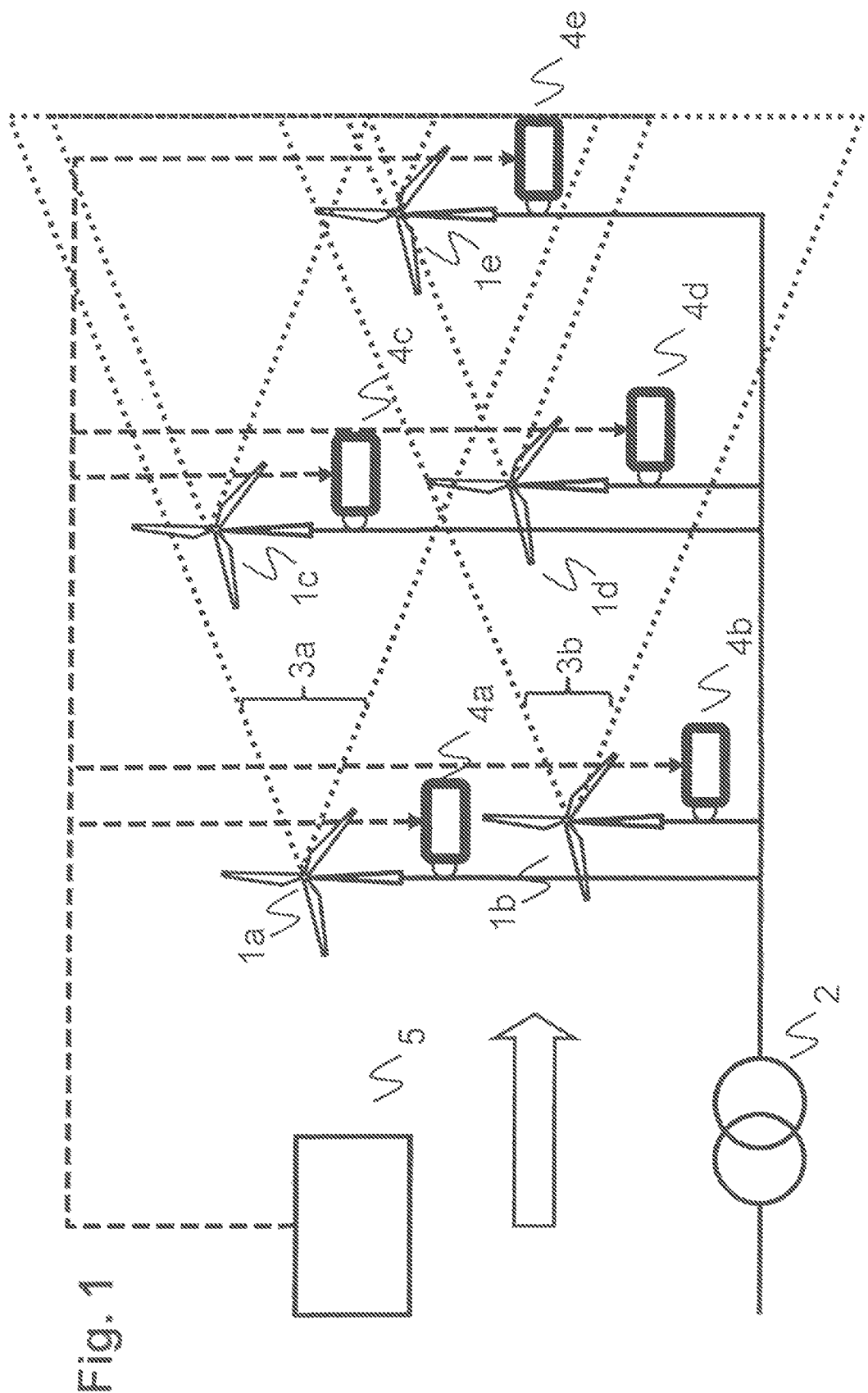
FIG. 1 a first embodiment of the invention with local frequency support control.

FIG. 1 shows a Wind Farm (WF) with five Wind Turbines (WT) 1a to 1e connected to a power grid at a Point of Common Coupling 2. With a wind direction from left to right, upwind WTs 1a, 1b produce a wake 3a, 3b that affects the downwind WTs 1c, 1d, 1e. Each WT has a local dynamic frequency support controller 4a to 4e communicatively connected to a WF controller 5 (broken lines). The WF controller determines and dispatches to the local controllers optimum turbine control input values u$_j$* for a regular WT operation as well as individual frequency deviation control parameters such as droop settings or lookup tables to be used in case of a frequency contingence.

Figure 2:
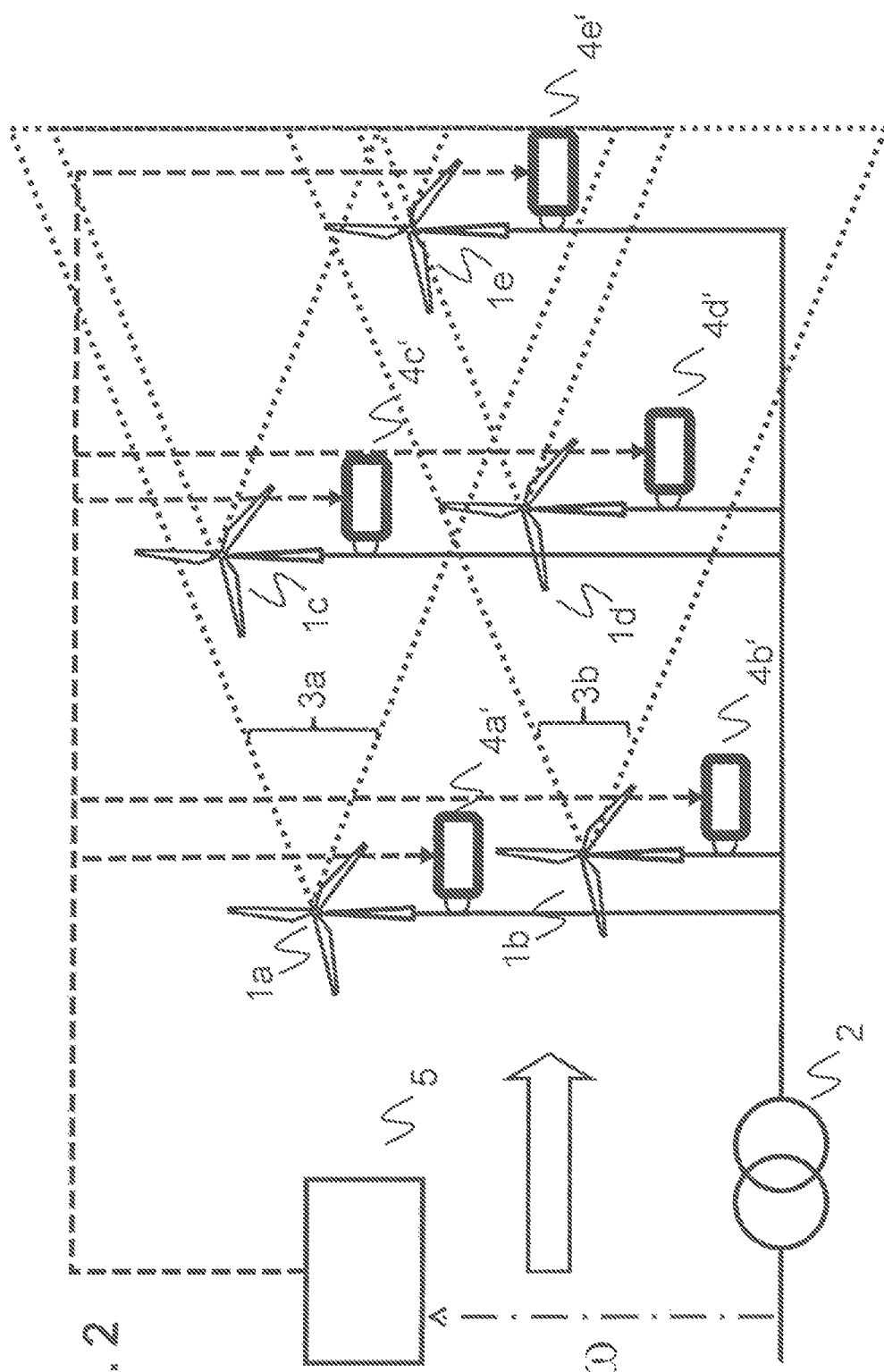
FIG. 2 a second embodiment with central frequency support control.

FIG. 2 shows the WF of FIG. 1, but with a fast real-time communication between the WF controller and local WT controllers 4a' to 4e'. A dynamic frequency support unit at WF level determines, in a real-time optimization following a frequency event and based on measurement of a deviating frequency ω at PCC, optimum frequency support turbine control input values u$_{fi}$* for all WTs of the WF. These values are instantaneously distributed or communicated to the individual WTs controllers.

Figure 3:
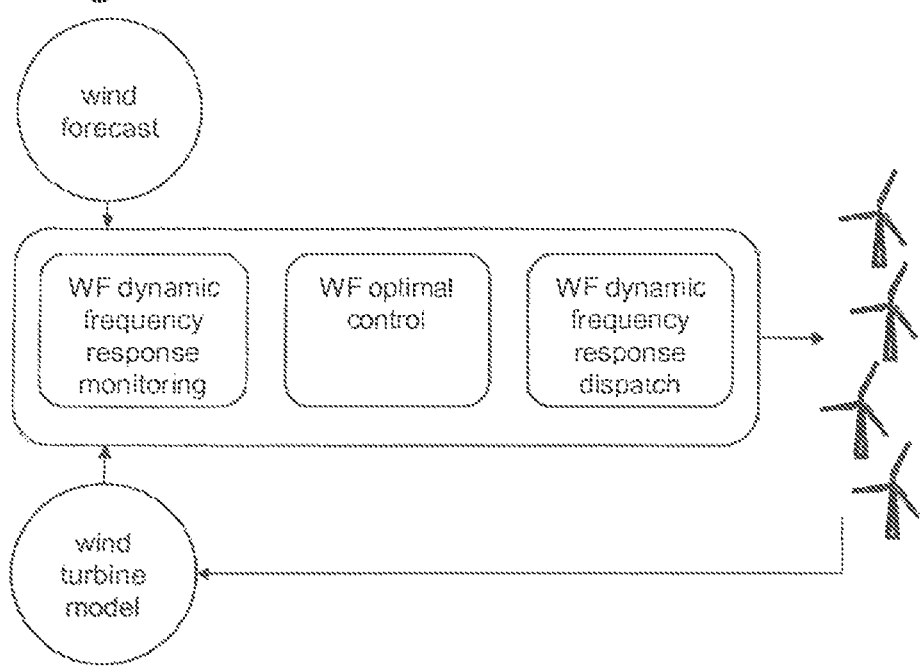
FIG. 3 a controller architecture.

FIG. 3 depicts an exemplary WF dynamic frequency response management system comprising a wind farm dynamic frequency response monitoring system, a wind farm optimal control module and a wind farm dynamic frequency response dispatch module. The monitoring module may display on-line a dynamic frequency response capability of the entire wind farm based on measurements of turbines operating parameter, such as pitch angle, rotating speed, power output, etc. The monitoring system may also be able to display a future dynamic frequency response capability of the entire wind farm based on wind forecasting data, both short term and long term. To that purpose, a model of wind turbine dynamic frequency response (in terms its control strategies, wind condition, output power) must be available. The optimal control module decides about a power output and a level of dynamic frequency response contribution of the individual wind turbines, taking into account the wind wake and wind forecasting. The dispatch module communicates the dynamic frequency response requirements to the individual wind turbines.

Figure 4:
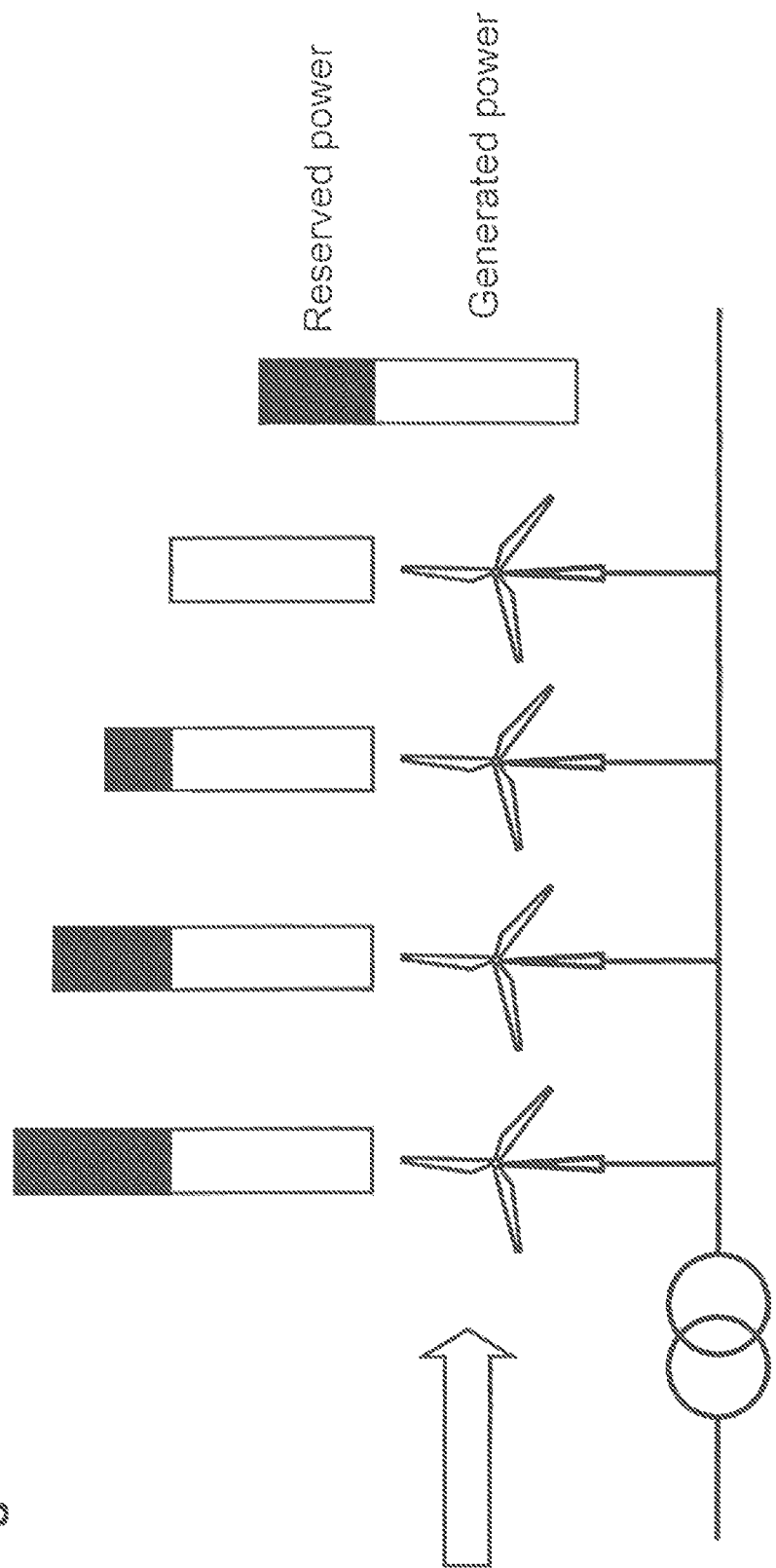
FIG. 4 an exemplary reserved power and output power distribution in wind direction.

FIG. 4 depicts an exemplary outcome of a wind farm level optimization considering wake effects. Upwind turbines operate below full capability in order to save wind energy on behalf of the downwind turbines and in order to provide for optimal dynamic frequency support power reserve. In such case, the upwind turbines can increase their output in a short time, wherein activation of reserve power at upwind turbine may reduce reserve power at downwind turbines.

Figure 5:
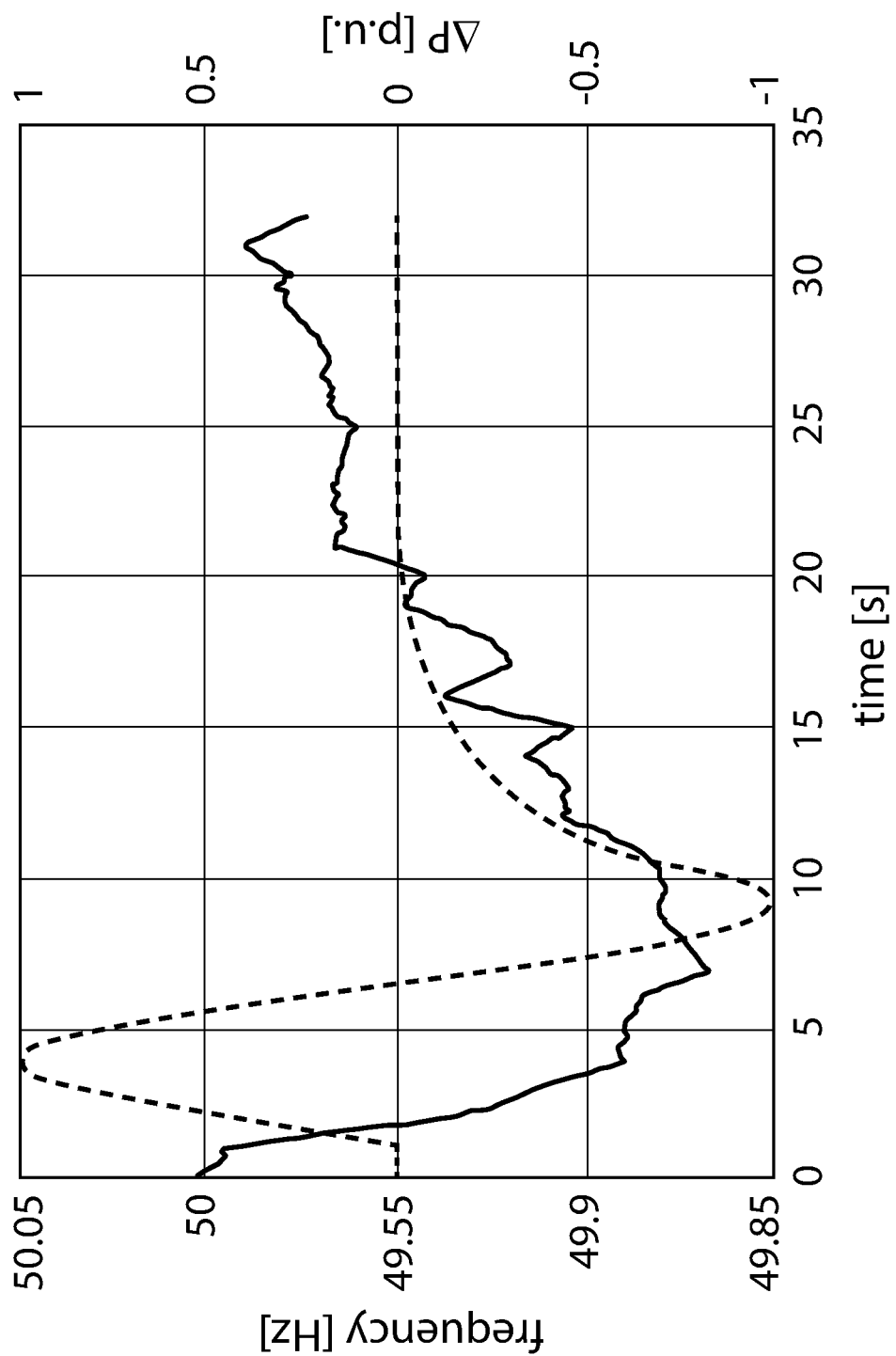
FIG. 5 a dynamic frequency support of a PFC type.
Figure 6:
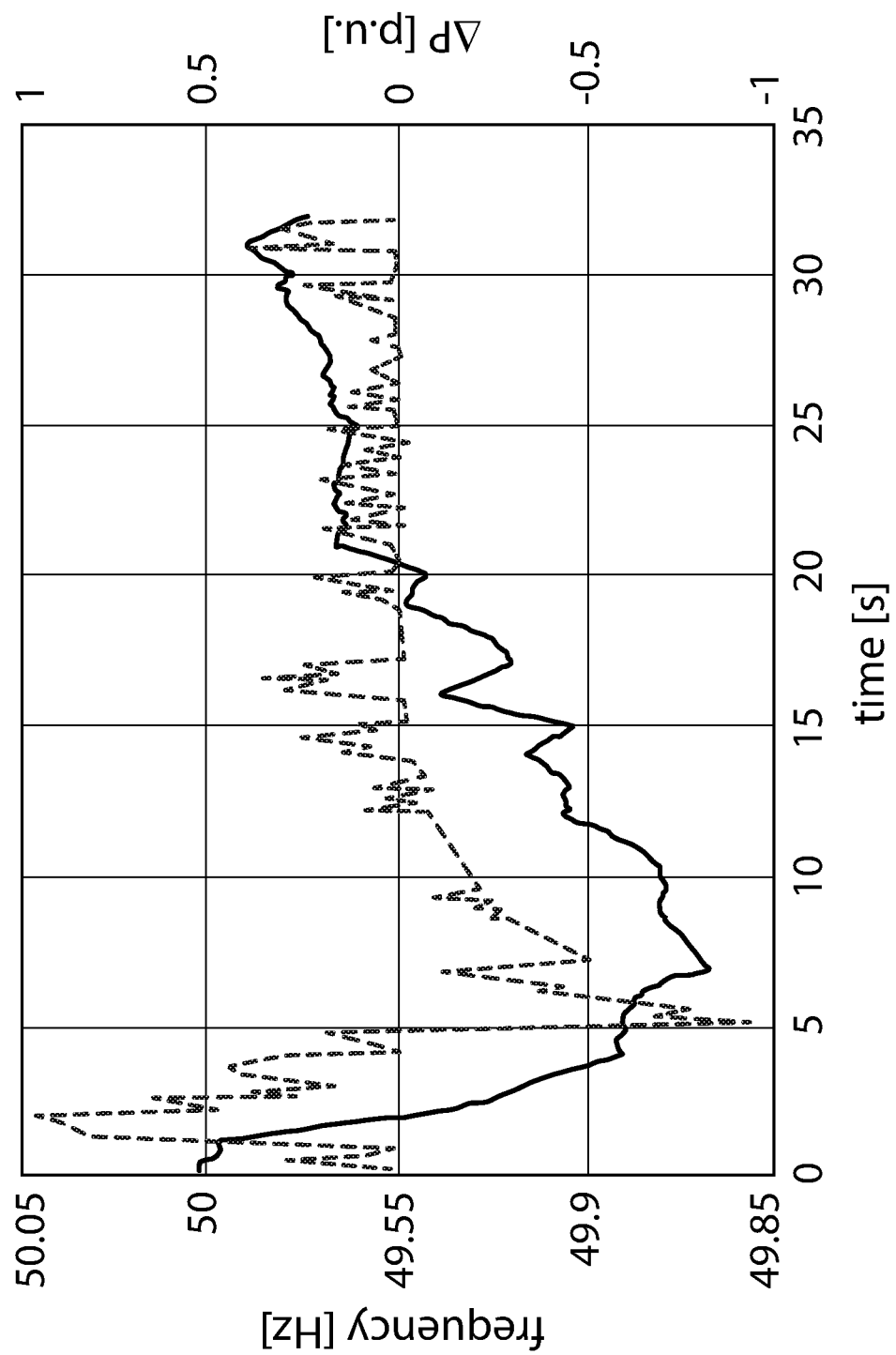
FIG. 6 a dynamic frequency support of an inertial control type.

FIGS. 5 and 6 depict an exemplary measured power system frequency evolution (solid line) following a frequency event and starting at a nominal value of 50 Hz. The dashed line indicates the simulated additional power AP, or power difference w.r.t. nominal, provided to or from the WT. After approximately six seconds, the available energy of the WT is fully consumed, and the system has to counter-steer in order to put the energy back into the WT. In FIG. 5, the additional power exchange results exclusively from a Primary Frequency Control (PFC) response depending on $(f-f_{ref})$ on a fast time scale, whereas in FIG. 6, an inertia-type control mode depending on (df/dt) is active for dynamic frequency control. While dynamic frequency control may be based exclusively on an inertia-type term proportional to a change in frequency (df/dt) or on a PFC-type term proportional to a frequency deviation $(f-f_{ref})$, a combination of PFC on a time scale of seconds and virtual inertia control on a sub-second time scale is most effective. Ultimately dynamic frequency control could additionally be based on some integral over $(f-f_{ref})$, in which case there is a full analogy to a PID controller.

The WF dynamic frequency support target may be based on a worst-case frequency deviation or ROCOF as determined by a particular load being added to, or generation capability being removed from, the power system, and translate into an active power reserve of, for instance, 5% of nominal wind farm power within a first period, and/or a minimum response rate of 1% of rated power per second during a second period. The WF dynamic frequency support target or WF active power reserve required may be written as a sum of individual WT contributions as $S_n H = S_{n1} H_1 + S_{n2} H_2 + \ldots + S_{nN} H_N$, where $S_{ni}$ and $H_i$ denote a rated power and inertia constant for the WT with index i. The WT inertia constant $H_i$ has a dimension of [seconds] and is defined via $$\frac{2 S_n H}{\omega_{nom}} \frac{d\omega}{dt} = P_{mech} - P_{el}$$

where $P_{mech}$ is the available mechanical power and $P_{el}$ is the generated electrical power. The foregoing exemplary equations may be evaluated by the WF dynamic frequency support unit when deciding about individual WT participation to the WF dynamic frequency support target.

The features of the method of operating a wind farm and the wind farm controller as described herein may be performed by way of hardware components, firmware, and/or a computing device having processing means programmed by appropriate software. For instance, the wind farm controller can include any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor can be programmed or configured to include and perform features of the exemplary embodiments of the present disclosure such as a method of operating a wind farm. The features can be performed through program or software code encoded or recorded on the processor, or stored in a non-volatile memory accessible to the processor, such as Read-Only Memory (ROM), erasable programmable read-only memory (EPROM), or other suitable memory or circuit as desired. In another exemplary embodiment, the program or software code can be provided in a computer program product having a non-transitory computer readable recording medium such as a hard disk drive, optical disk drive, solid state drive, or other suitable memory device or circuit as desired, the program or software code being transferable or downloadable to the processor for execution when the non-transitory computer readable medium is placed in communicable contact with the processor.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

Preferred embodiments of the present invention, in particular as described above, may be realized as detailed in the items listed below, advantageously in combination with one or more of the features as detailed above:

1. A method of operating a Wind Farm WF with a plurality of Wind Turbine Generators WT electrically connected to a power grid having a nominal grid frequency, comprising
   providing a wind farm dynamic frequency support target for stabilization of a grid frequency by the wind farm;
   determining optimum turbine control input values $u_j^*$ for the WTs of the WF, based on the wind farm dynamic frequency support target and considering inter-WT wake effects;
   operating the WTs according to the optimum turbine control input values $u_j^*$.
2. The method of item 1, comprising
   determining optimum turbine control input values $u_j^*$ that optimize an objective function J(u) indicative of a WF active power output and/or indicative of a wind farm dynamic frequency support.
3. The method of item 2, comprising
   providing a wind forecast for the wind farm, and
   determining optimum turbine control input values $u_j^*(t)$ that optimize an objective function J(u) depending on the turbine control input of each wind turbine and depending on the wind forecast.

4. The method of item 1, comprising
determining and communicating to the WTs the optimum turbine control input values $u_j^*$ at least every minute, and preferably at least once per second.

5. The method of any of items 1 to 4, comprising
determining, prior to a frequency event, a first frequency deviation control parameter value and a second frequency deviation control parameter value different from the first frequency deviation control parameter value, and
operating a local dynamic frequency support controller of a first WT based on the first frequency deviation control parameter value, and operating a local dynamic frequency support controller of a second WT based on the second frequency deviation control parameter value.

6. The method of item 5, comprising
operating the local dynamic frequency support controller of the first WT in an inertial response mode within one second, preferably within 200 milliseconds, following a detection of a frequency event.

7. The method of item 5, comprising
operating the local dynamic frequency support controller of the first WT in an inertial response mode based on a first frequency deviation control parameter value, and
operating the local dynamic frequency support controller of the first WT in a primary frequency control mode based on a second frequency deviation control parameter value.

8. The method of any of items 1 to 4, comprising
determining, upon occurrence of a frequency event and based on a measurement of the grid frequency at PCC, optimum frequency support turbine control input values $u_{fi}^*$ for frequency support response, and
communicating the optimum frequency support turbine control input values $u_{fi}^*$ to local WT controllers of the WTs of the WF, wherein the local controllers are devoid of a frequency input.

9. The method of item 8, wherein the optimum frequency support turbine control input values $u_{fi}^*$ are determined and communicated within one second, preferably within 200 milliseconds, following a detection of the frequency event.

10. A Wind Farm WF controller for a WF with a plurality of Wind Turbine Generators WT electrically connected to a power grid having a nominal grid frequency, adapted to determine optimum turbine control input values $u_j^*$ for the WTs of the WF, based on a WF inertia target for stabilizing a grid frequency and considering inter-WT wake effects; and adapted to transmit the optimum turbine control input values $u_j^*$ to WT controllers for operating the WTs accordingly.

The invention claimed is:

1. A method of operating a Wind Farm WF with a plurality of Wind Turbine Generators WT electrically connected to a power grid having a nominal grid frequency, comprising:
providing a wind farm dynamic frequency support target for stabilization of a grid frequency by the wind farm;
determining optimum turbine control input values $u_j^*$ for the WTs of the WF, based on the wind farm dynamic frequency support target and considering inter-WT wake effects;
operating the WTs according to the optimum turbine control input values $u_j^*$;
providing a wind forecast for the wind farm, said wind forecast comprising a local wind forecast which takes into account turbine control input values of the at least one upstream wind turbine including one or more of a pitch angle, yaw angle, nacelle direction, rotor blade settings, rotation speed of the turbine, generator torque, and set-points for active power (P) or reactive (Q), and/or corresponding actual or observed values;
determining optimum turbine control input values $u_j^*(t)$ that optimize an objective function J(u) depending on the turbine control input of a plurality of wind turbines and depending on the wind forecast;
determining, upon occurrence of a frequency event and based on a measurement of the grid frequency at PCC, optimum frequency support turbine control input values $u_{fi}^*$ for frequency support response, and
communicating the optimum frequency support turbine control input values $u_{fi}^*$ to local WT controllers of the WTs of the WF;
wherein the local controllers are devoid of a frequency input.

2. The method of claim 1, comprising:
determining optimum turbine control input values $u_j^*$ that optimize an objective function J(u) indicative of a wind farm dynamic frequency support comprising virtual inertia.

3. The method of claim 1, wherein the wind forecast comprises a meteorological wind forecast.

4. The method of claim 1, wherein the objective function comprises a forecast cost for changing set-points and/or activating actuators of at least one wind turbine.

5. The method according to claim 1, comprising:
determining and communicating to the WTs the optimum turbine control input values $u_j^*$ at least every minute.

6. The method of claim 1, comprising:
determining, prior to a frequency event, a first frequency deviation control parameter value, and
operating, upon occurrence of a frequency event, a first local dynamic frequency support controller of a first WT based on the first frequency deviation control parameter value.

7. The method of claim 6, comprising:
determining, prior to a frequency event, a second frequency deviation control parameter value different from the first frequency deviation control parameter value, and
operating, upon occurrence of a frequency event, a second local dynamic frequency support controller of a second WT based on the second frequency deviation control parameter value.

8. The method of claim 6, comprising:
operating the first local dynamic frequency support controller of the first WT in an inertial response mode within one second following a detection of a frequency event.

9. The method of claim 6, comprising:
operating the first local dynamic frequency support controller of the first WT in an inertial response mode based on a short-term frequency deviation control parameter value, and
operating the first local dynamic frequency support controller of the first WT in a primary frequency control mode based on a mid-term frequency deviation control parameter value.

10. The method of claim 9, wherein
in the inertial response mode, the local dynamic frequency support controller of the first WT is operated based on a derivative df/dt of an actual grid frequency with respect to time.

11. The method of claim 9, wherein
in the primary frequency control mode, the local dynamic frequency support controller of the first WT is operated based on a deviation $f-f_{ref}$ between an actual grid frequency and the nominal grid frequency.

12. The method of claim 1, wherein the optimum frequency support turbine control input values $u_{fi}*$ are determined and communicated within one second following a detection of the frequency event.

13. The method of claim 1, comprising:
determining, upon occurrence of a frequency event and based on a measurement of the grid frequency at PCC, optimum frequency support turbine control input values $u_{fi}*$ for frequency support response, and
instantaneously communicating and/or distributing the optimum frequency support turbine control input values $u_{fi}*$ to a plurality of the individual WTs of the WF.

14. The method of claim 13, further comprising disabling of control loops at wind turbine level for at least one wind turbine.

15. The method of claim 1, further comprising:
in case of a frequency event, providing dynamic frequency support by at least one downstream wind turbine, while, at least initially, not providing dynamic frequency support by at least a first wind turbine upstream of said downstream wind turbine.

16. The method of claim 15, further comprising:
in case of a frequency event, providing dynamic frequency support by at least one downstream wind turbine, while, at least initially, not providing dynamic frequency support by any of the wind turbines upstream of said downstream wind turbine.

17. The method of claim 1, further comprising:
setting a first, individual WT inertia target of an upstream wind turbine at a higher absolute or relative value than a second, individual WT inertia target of a downstream wind turbine.

18. The method of claim 17, further comprising:
setting a first, individual WT inertia target of an upstream wind turbine at a higher absolute or relative value than the second, individual WT inertia target of any downstream wind turbine in the wind field.

19. A method of operating a Wind Farm WF with a plurality of Wind Turbine Generators WT electrically connected to a power grid having a nominal grid frequency, comprising:
providing a wind farm dynamic frequency support target for stabilization of a grid frequency by the wind farm;
determining optimum turbine control input values $u_j*$ for the WTs of the WF, based on the wind farm dynamic frequency support target and considering inter-WT wake effects;
operating the WTs according to the optimum turbine control input values $u_j*$;
providing a wind forecast for the wind farm, said wind forecast comprising a local wind forecast which takes into account turbine control input values of the at least one upstream wind turbine including one or more of a pitch angle, yaw angle, nacelle direction, rotor blade settings, rotation speed of the turbine, generator torque, and set-points for active power (P) or reactive (Q), and/or corresponding actual or observed values;
determining optimum turbine control input values $u_j*(t)$ that optimize an objective function $J(u)$ depending on the turbine control input of a plurality of wind turbines and depending on the wind forecast;
determining, prior to a frequency event, a first frequency deviation control parameter value;
operating, upon occurrence of a frequency event, a first local dynamic frequency support controller of a first WT based on the first frequency deviation control parameter value;
operating the first local dynamic frequency support controller of the first WT in an inertial response mode based on a short-term frequency deviation control parameter value; and
operating the first local dynamic frequency support controller of the first WT in a primary frequency control mode based on a mid-term frequency deviation control parameter value.

20. The method of claim 19, wherein
in the inertial response mode, the local dynamic frequency support controller of the first WT is operated based on a derivative $df/dt$ of an actual grid frequency with respect to time.

21. A method of operating a Wind Farm WF with a plurality of Wind Turbine Generators WT electrically connected to a power grid having a nominal grid frequency, comprising:
providing a wind farm dynamic frequency support target for stabilization of a grid frequency by the wind farm;
determining optimum turbine control input values $u_j*$ for the WTs of the WF, based on the wind farm dynamic frequency support target and considering inter-WT wake effects;
operating the WTs according to the optimum turbine control input values $u_j*$;
providing a wind forecast for the wind farm, said wind forecast comprising a local wind forecast which takes into account turbine control input values of the at least one upstream wind turbine including one or more of a pitch angle, yaw angle, nacelle direction, rotor blade settings, rotation speed of the turbine, generator torque, and set-points for active power (P) or reactive (Q), and/or corresponding actual or observed values;
determining optimum turbine control input values $u_j*(t)$ that optimize an objective function $J(u)$ depending on the turbine control input of a plurality of wind turbines and depending on the wind forecast;
determining, upon occurrence of a frequency event and based on a measurement of the grid frequency at PCC, optimum frequency support turbine control input values $u_{fi}*$ for frequency support response;
instantaneously communicating and/or distributing the optimum frequency support turbine control input values $u_{fi}*$ to a plurality of the individual WTs of the WF; and
disabling of control loops at wind turbine level for at least one wind turbine.

* * * * *